United States Patent [19]
Havens et al.

[11] Patent Number: 5,534,041
[45] Date of Patent: Jul. 9, 1996

[54] METHOD OF MAKING LASER EYEWEAR PROTECTION

[75] Inventors: Thomas G. Havens, Painted Post; David J. Kerko, Corning; JoAnn Morrell, Horseheads, all of N.Y.

[73] Assignee: Corning Incorporated, Corning, N.Y.

[21] Appl. No.: 334,929

[22] Filed: Nov. 7, 1994

[51] Int. Cl.$^6$ .................................................. C03C 15/00
[52] U.S. Cl. ............................................ 65/30.1; 65/30.13
[58] Field of Search ................................. 65/30.1, 30.11, 65/32.1, 32.3, 32.4

[56] References Cited

U.S. PATENT DOCUMENTS

| | | | |
|---|---|---|---|
| 4,076,542 | 2/1978 | Deeg et al. | 106/52 |
| 4,118,214 | 10/1978 | Wedding | 65/30.1 |
| 4,190,451 | 2/1980 | Hares et al. | 106/47 Q |
| 4,240,836 | 12/1980 | Borrelli et al. | 106/47 Q |
| 4,251,278 | 2/1981 | Hares | 106/47 Q |
| 4,284,686 | 8/1981 | Wedding | 428/334 |
| 4,290,794 | 9/1981 | Wedding | 65/30.11 |
| 4,304,584 | 12/1981 | Borrelli et al. | 65/30.11 |
| 4,390,635 | 6/1983 | Morgan | 501/13 |
| 4,498,919 | 2/1985 | Mann | 65/30.11 |
| 4,832,724 | 5/1989 | Borrelli et al. | 65/30.11 |
| 4,840,655 | 6/1989 | Borrelli et al. | 65/30.11 |
| 4,908,054 | 3/1990 | Jones et al. | 65/30.11 |
| 4,979,975 | 12/1990 | Borrelli et al. | 65/30.11 |
| 4,979,976 | 12/1990 | Havens et al. | 65/30.11 |
| 5,127,930 | 7/1992 | Howorth | 65/30.13 |

*Primary Examiner*—Donald E. Czaja
*Assistant Examiner*—Sean Vincent
*Attorney, Agent, or Firm*—Milton M. Peterson; Angela N. Nwaneri

[57] ABSTRACT

Glass articles transparent to visible radiation, but opaque to ultraviolet radiation, rendering them particularly suitable for protecting the wearer of such lenses from exposure to laser radiation in the ultraviolet regions of the electromagnetic spectrum are produced. The method involves exposing silver halide-containing glass articles to flowing hydrogen in a heat chamber operating at 375°–500° C. for at least four hours to produce an integral reduced layer in at least one surface of the articles of sufficient depth to prevent the transmission of ultraviolet radiation through the articles.

8 Claims, 4 Drawing Sheets

METHOD OF MAKING LASER EYEWEAR PROTECTION

RELATED APPLICATION

U.S. application Ser. No. 08/334,932, filed concurrently herewith and assigned to the same assignees as the present application by T. G. Havens, D. J. Kerko, and JoAnn Morrell, under the title GLASSES FOR LASER PROTECTION, is directed to the production of glass articles which are essentially completely opaque to ultraviolet radiation and can be essentially completely opaque to radiation within the region of wavelengths up to 550 nm, but are transparent to visible radiation having a wavelength longer than the radiation within the region of opacity. The method contemplates exposing cuprous halide- or a cuprous-cadmium halide-containing glasses to a hydrogen gas-containing atmosphere at a temperature between about 375°–500° C. for a period of at least eight hours to develop an integral reduced layer in at least one surface of the articles having a depth effective to prevent the transmission of ultraviolet radiation and radiation having a wavelength up to 500 nm through the article. The resulting glasses provide excellent protection against the exposure of laser radiation in the above regions of the spectrum.

BACKGROUND OF THE INVENTION

Corning Incorporated, Corning, N.Y., has marketed photochromic glass lenses for at least 10 years which behave as filter glasses in exhibiting cut-offs of electromagnetic radiation at various specific wavelengths. Such lenses have been worn principally by persons requiring protection from ultraviolet radiation and have been marketed under such trademarks as CPF450 and CPF550, the number signifying a cutoff of radiation below 450 nm and 550 nm, respectively.

Those glasses had their genesis in U.S. Pat. No. 4,240,836 (Borrelli et al.) which describes a method for producing surface colored photochromic glasses which, in the undarkened state, exhibit red and purple colorations or mixtures of orange, red, purple, and/or blue colors in transmitted light. The method comprised subjecting silver halide-containing, photochromic glasses to a specified heat treatment under reducing conditions. Thus, as explained in the patent, the method involved heat treating a silver halide-containing, photochromic glass under reducing conditions at a temperature not exceeding about 450° C. for a time sufficient to develop specific visible light absorption characteristics in the glass. Heat treating temperatures between 200°–450° C. were found to be operable, with temperatures between 350°–450° C. being preferred. The light absorption characteristics developed as a result of the reduction heat treatment are such that the glass demonstrates in the undarkened state a spectral transmittance curve comprising at least one treatment-induced absorption peak having a location and an intensity such that the peak falls within the spectral transmittance region to the right of line CB in FIG. 1 of the drawings. The peak is not present in the parent photochromic glass from which the surface-colored article is fashioned. Accordingly, in the surface colored glass, the surface color differs from the color of the bulk glass (if the bulk glass is colored), a condition that can be readily determined by comparing the spectral transmittance characteristics of the article before and after the removal of a small amount of surface glass therefrom.

The patentees theorized that the surface coloring effects were caused by the chemical reduction of silver in contact with silver halide microcrystals in a region very close to the surface of the glass article, with the identity of the color being determined by the geometric form and arrangement of metallic silver on those microcrystals. Confirmation of that theory was provided via experiments demonstrating that, utilizing a given reduction heat treatment, a particular photochromic glass can display any of a number of absorption peaks depending upon the process initially employed to generate the silver halide microcrystals in the glass. U.S. Pat. No. 4,240,836 is expressly incorporated herein by reference.

Corning Incorporated has marketed photochromic filter glasses derived from three base silver halide-containing, photochromic glass compositions, viz., Corning Code 8111 glass, Corning Code 8122 glass, and Corning Code 8135 glass.

Corning Code 8111 glass has a composition coming within the ranges disclosed in U.S. Pat. No. 4,190,451 (Hares et al.), the glasses described therein consisting essentially, in weight percent, of about 0–2.5% $Li_2O$, 0–9% $Na_2O$, 0–17% $K_2O$, 0–6% $Cs_2O$, 8–20% $Li_2O+Na_2O+K_2O+Cs_2O$, 14–23% $B_2O_3$, 5–25% $Al_2O_3$, 0–25% $P_2O_5$, 20–65% $SiO_2$, 0.004–0.02% CuO, 0.15–0.3% Ag, 0.1–0.25% Cl, and 0.1–0.2% Br, wherein the molar ratio of alkali metal oxides:$B_2O_3$ ranges about 0.55–0.85, and the weight ratio Ag:(Cl+Br) ranges about 0.65–0.95. Hares et al. further observed that those glasses may also contain up to about 10% total of optional constituents, expressly referring to 0–6% $ZrO_2$, 0–3% $TiO_2$, 0–0.5% PbO, 0–7% BaO, 0–4% CaO, 0–3% MgO, 0–6% $Nb_2O_5$, 0–4% $La_2O_3$ and 0–2% F. Finally, the patentees noted that up to 1% total of transition metal oxide colorants and/or up to 5% total of rare earth metal oxide colorants can be included without adversely affecting the photochromic behavior of the glass. U.S. Pat. No. 4,190,451 is expressly incorporated herein by reference.

Corning Code 8111 glass has the following approximate composition, expressed in terms of parts by weight. However, because the sum of the ingredients closely approaches 100, for all practical purposes the individual values recited may be considered to reflect weight percent.

| $SiO_2$ | 55.8 | $Na_2O$ | 4.0 | Ag | 0.24 |
|---|---|---|---|---|---|
| $Al_2O_3$ | 6.5 | $K_2O$ | 5.8 | Cl | 0.20 |
| $B_2O_3$ | 18.0 | $ZrO_2$ | 4.9 | Br | 0.13 |
| $Li_2O$ | 1.9 | $TiO_2$ | 2.2 | CuO | 0.011 |

Corning Code 8122 glass has a composition coming within the ranges claimed in U.S. Pat. No. 4,251,278 (Hares), the glasses described therein being silver halide-containing photochromic glasses wherein about 1–10 ppm palladium and/or gold is included in the compositions. U.S. Pat. No. 4,251,278 refers to two composition regions wherein additions of palladium and/or gold are especially operable. The first region tracks the composition intervals encompassed within U.S. Pat. No. 4,190,451, supra. The second region included glasses consisting essentially, in weight percent, of 40–76% $SiO_2$, 4–26% $Al_2O_3$, 4–26% $B_2O_3$, at least one alkali metal oxide in the indicated proportion of 2–8% $Li_2O$, 4–15% $Na_2O$, 4–15% $K_2O$, 8–25% $Rb_2O$, and 10–30% $Cs_2O$, at least one halogen in the indicated minimum effective proportion of 0.2% chlorine, 0.1% bromine, and 0.08% iodine, and a minimum of silver in the indicated proportion of 0.2% in a glass wherein the effective halogen is chlorine, 0.05% in a glass containing at least 0.1% bromine, but less than 0.08% iodine, and 0.03% in a glass containing at least 0.08% iodine, the sum of those components constituting at least 85% by weight of the total composition. U.S. Pat. No. 4,251,278 is expressly incorporated herein by reference.

Corning Code 8122 glass has the following approximate composition, expressed in terms of parts by weight. In like manner to Code 8111 glass above, however, because the sum of the ingredients closely approaches 100, for all practical purposes the individual values reported may be deemed to represent weight percent.

| $SiO_2$ | 56.3 | $K_2O$ | 5.7 | Cl | 0.22 |
|---|---|---|---|---|---|
| $Al_2O_3$ | 6.2 | $ZrO_2$ | 5.0 | Br | 0.15 |
| $B_2O_3$ | 18.1 | $TiO_2$ | 2.2 | CuO | 0.006 |
| $Li_2O$ | 1.8 | $Er_2O_3$ | 0.25 | Pd | 0.0002 |
| $Na_2O$ | 4.1 | Ag | 0.21 | | |

Corning Code 8135 glass has a composition included within the ranges disclosed in U.S. Pat. No. 4,390,635 (Morgan), the glasses described therein consisting essentially, in weight percent, of 0–2.5% $Li_2O$, 0–9% $Na_2O$, 0–17% $K_2O$, and 0–8% $Cs_2O$, the sum of $Li_2O+Na_2O+K_2O+Cs_2O$ being 8–20%, 5–25% $Al_2O_3$, 14–23% $B_2O_3$, 40–65% $SiO_2$, 0.004–0.02% CuO, 0.15–0.3% Ag, 0.1–0.25% Cl, 0.1–0.2% Br, the molar ratio alkali metal oxide:$B_2O_3$ ranging between 0.55–0.85, where the composition is essentially free from divalent metal oxides other than CuO, the weight ratio Ag:(Cl+Br) ranging between about 0.65–0.95, about 0.03–0.25 $Cr_2O_3$, and about 0.025–0.3% $As_2O_3$ and/or $Sb_2O_3$, as analyzed in the glass, wherein over 50% of the copper is present as $Cu^+$ ions. The patentee observed that up to 10% total of the following optional ingredients in the indicated proportions may also be present: up to 6% $ZrO_2$, up to 3% $TiO_2$, up to 1% PbO, up to 7% BaO, up to 4% CaO, up to 3% MgO, up to 6% $Nb_2O_5$, up to 4% $La_2O_3$, and up to 2% F. Furthermore, up to 1% total of non-oxidizing transition metal oxides and/or up to 5% total of non-oxidizing rare earth metal oxides.

Corning Code 8135 glass has the following approximate composition, expressed in terms of parts by weight. Yet again, however, because the sum of the components closely approaches 100, for all practical purposes the individual values may be considered to represent weight percent.

| $SiO_2$ | 56.4 | $K_2O$ | 5.72 | Ag | 0.24 |
|---|---|---|---|---|---|
| $Al_2O_3$ | 6.2 | $ZrO_2$ | 4.99 | Cl | 0.215 |
| $B_2O_3$ | 18.1 | $TiO_2$ | 1.91 | Br | 0.16 |
| $Li_2O$ | 1.82 | NiO | 0.144 | CuO | 0.0057 |
| $Na_2O$ | 4.08 | CoO | 0.082 | | |

U.S. Pat. No. 4,390,635 is expressly incorporated herein by reference.

U.S. Pat. No. 4,979,976 (Havens et al.) describes a modification of the reduction heat treatment disclosed in U.S. Pat. No. 4,240,836, supra. The patentees observed that an atmosphere of flowing hydrogen had been found to comprise the most effective and efficient environment for the reduction heat treatment of silver halide-containing photochromic glasses to generate surface tints therein. Because of the dangers inherent in using hydrogen, the flow thereof into the heat treating chamber was slow with the consequence that the surface layer developed was not of uniform thickness across all regions of a glass article. Furthermore, a relatively long exposure period, i.e., at least 30 minutes and customarily at least 60 minutes, is required to assure a sufficient depth in the surface layer across all regions of the article. Because the photochromic behavior exhibited by a glass is activated by ultraviolet radiation, the reduced surface layer on the front side of a glass article, for example, the convex side of an ophthalmic lens, must be thin enough to permit the passage of sufficient ultraviolet radiation therethrough to render the article uniformly photochromic. That necessity resulted in the practice termed "front siding". That practice comprises grinding and polishing the front surface of an article to secure a surface layer of uniform thickness across the article, the thickness of the layer being gauged to allow sufficient ultraviolet radiation to pass through into the bulk of the article to activate photochromism therein.

U.S. Pat. No. 4,979,976 discloses a method for producing a reduced surface layer on a photochromic glass article wherein the surface layer will have a uniform thickness across all regions of the article and the thickness can be so controlled that front siding is rendered unnecessary. Moreover, the time required for achieving the surface layer of desired thickness is dramatically reduced.

The patentees produced such a surface layer by initially flowing hydrogen gas into the heat treating chamber at a sufficiently rapid rate to essentially instantaneously fill the chamber with the gas. The flow rate of the gas is thereafter immediately decreased to a velocity permitting careful control of the pace at which surface reduction takes place. The control provided by the method enables a reduced surface layer to be developed on the glass article of sufficient depth to yield the desired coloration, but not so deep as to inhibit the passage of ultraviolet radiation therethrough. In general, the total time required in the process will be on the order of 10–15 minutes.

U.S. Pat. No. 4,979,976 is expressly incorporated herein by reference.

Whereas the three glasses discussed above have been marketed by Corning Incorporated as filter glasses, i.e., glasses cutting off radiation at wavelengths shorter than a specific wavelength, they proved to be unacceptable when subjected to laser radiation of wavelengths within the ultraviolet and up into the blue region of the radiation spectrum.

Accordingly, the principal objective of the present invention was to devise glass compositions transparent to visible radiation, but essentially opaque to ultraviolet radiation, such that they would provide protection against laser radiation in the ultraviolet region of the electromagnetic spectrum and, where desired, up to 550 nm in the visible region thereof, i.e., in the blue region of the spectrum.

A specific objective of the present invention was to fabricate glass lenses which will protect the wearer from eye damage upon exposure to laser radiation.

BRIEF DESCRIPTION OF THE DRAWINGS

FIG. 1 is the transmittance curve of Corning Code 8122 glass fired for two hours in flowing hydrogen at a temperature of 475° C.

FIG. 2 is the transmittance curve of Corning Code 8111 glass fired for 20 hours in flowing hydrogen at 428° C.

FIG. 3 is the transmittance curve of Corning Code 8111 glass fired for 20 hours in flowing hydrogen at 416° C.

FIG. 4 is the transmittance curve of Corning Code 8111 glass fired for 44 hours in flowing hydrogen at 402° C.

FIG. 5 is the transmittance curve of Corning Code 8122 glass fired for four hours in flowing hydrogen at a temperature of 475° C.

FIG. 6 is the transmittance curve of Corning Code 8113 glass fired for 20 hours in flowing hydrogen at a temperature of 428° C.

FIG. 7 is the transmittance curve of Corning Code 8113 glass fired for 20 hours in flowing hydrogen at a temperature of 416° C. and FIG. 8 is the transmittance curve of Corning Code 8113 glass fired for 40 hours in flowing hydrogen at a temperature of 402° C.

GENERAL DESCRIPTION OF THE INVENTION

Because the three photochromic glasses in the form of sunglasses or ophthalmic lenses discussed above are worn outdoors, it was found to be cosmetically desirable to incorporate a small "Blue Light" leak in the radiation spectrum exhibited by those glasses. That is, the colors perceived by the eyeglass wearer are rendered more true through the inclusion of a small amount of radiation in the blue wavelengths. Unfortunately, however, the presence of the blue light leak rendered those glasses unacceptable for use as laser protection glasses.

Figure 1:
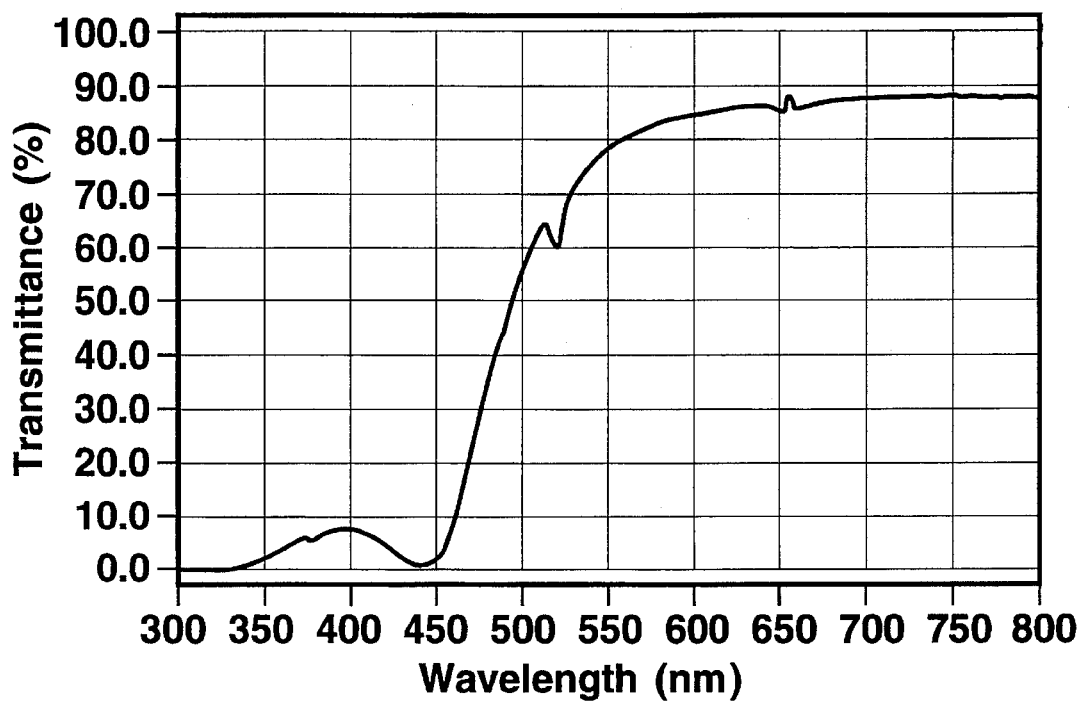
FIGS. 1, 2, 3, 4, 5, 6, 7 and 8 constitute graphs plotting transmittance vs. radiation wavelength. In each graph the abscissa records wavelengths in terms of nm and the ordinate records transmittances in terms of percent.
Figure 2:
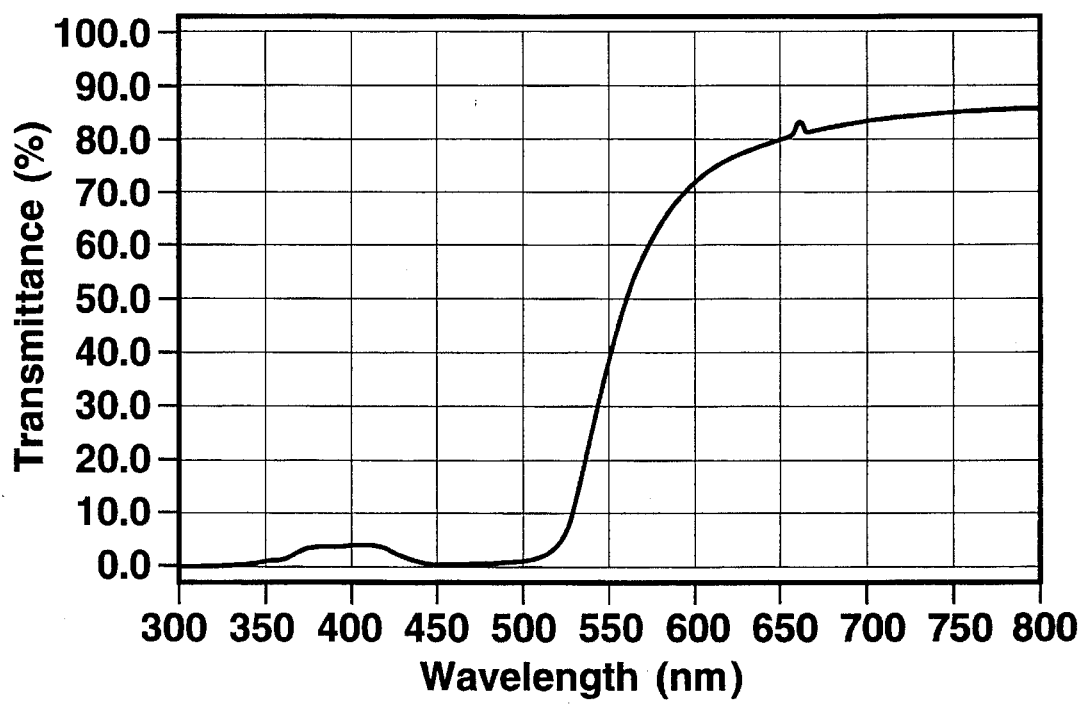
Figure 3:
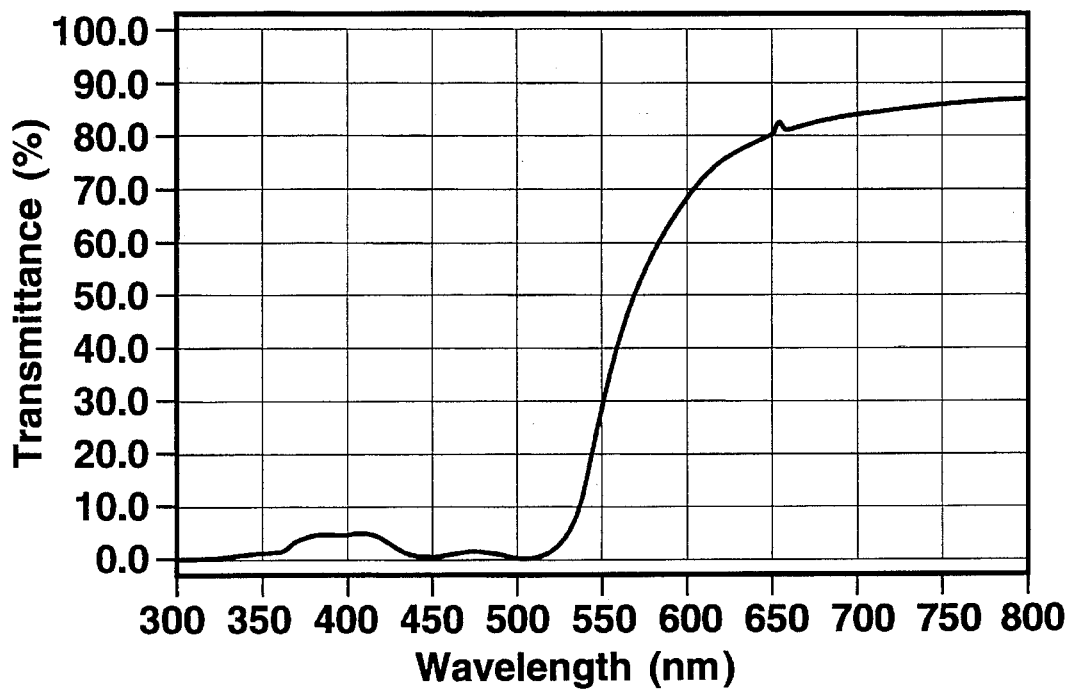
Figure 4:
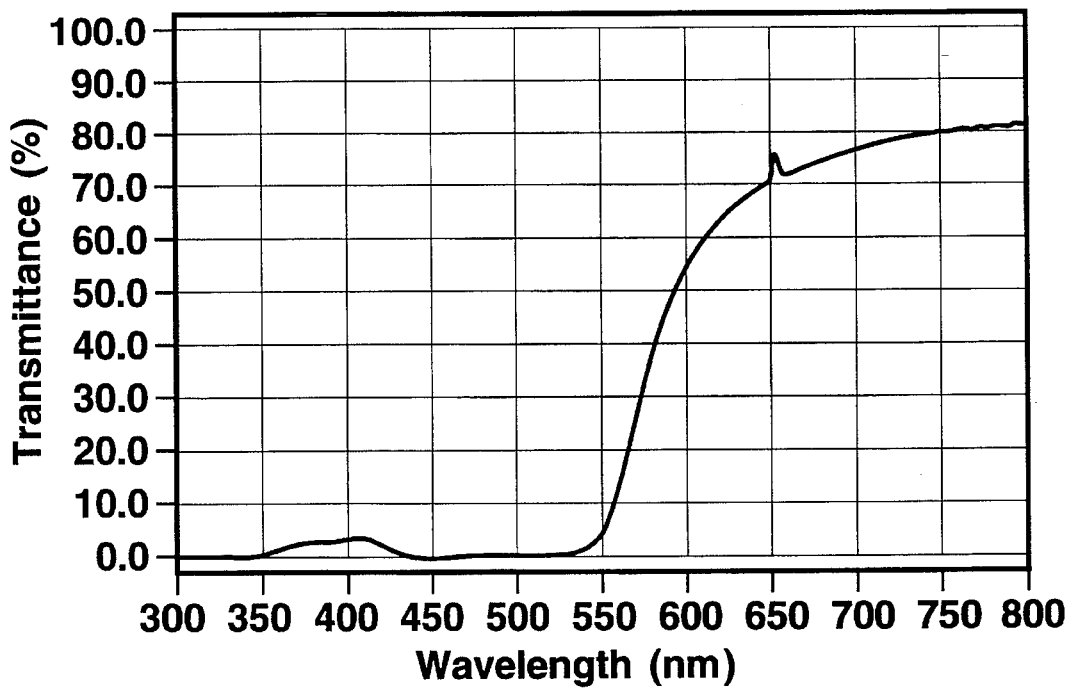

FIGS. 1–4 illustrate filter glasses of the type described above prepared by hydrogen-firing photochromic glasses to develop a reduced surface layer thereon and then front siding. Thus, FIG. 1 records the transmittance curve of Corning Code 8122 glass fired for two hours in flowing hydrogen at a temperature of 475° C. and then front sided. The glass was designed to provide a radiation cutoff below a wavelength of 450 nm. FIG. 2 records the transmittance curve of Corning Code 8111 glass fired for 20 hours in flowing hydrogen at a temperature of 428° C. and then front sided. The glass was designed to provide a radiation cutoff below a wavelength of 511 nm. FIG. 3 records the transmittance curve of Corning Code 8111 glass fired for 20 hours in flowing hydrogen at a temperature of 416° C. and then front sided. The glass was designed to provide a radiation cutoff below a wavelength of 527 nm. FIG. 4 records the transmittance curve of Corning Code 8111 glass fired for 44 hours in flowing hydrogen at a temperature of 402° C. and then front sided. The glass was designed to provide a radiation cutoff below a wavelength of 550 nm. As can be seen, in each instance there is slight loss in attenuation in the 350–450 nm range of wavelengths to provide the above-described blue light leak.

It was realized that, contrary to the filter glasses described immediately above, the application of glasses for laser shielding is for use indoors. Thus, the display of photochromic properties by the glass is not necessary or desirable. Accordingly, we conducted laboratory experimentation to determine whether silver halide-containing glass articles could be fired in hydrogen under such conditions, and by eliminating front siding or employing the method described in U.S. Pat. No. 4,979,976, supra, to impart a blue light leak therein, that they would exhibit sharp cutoffs ranging from 450–550 nm.

We have found that glass articles suitable for laser protection, that is, glass articles essentially completely blocking radiations in the ultraviolet region of the electromagnetic spectrum and also radiations having wavelengths up to 550 nm, can be produced from silver halide-containing glasses via subjecting such glasses to a reducing environment for an extended period of time within an operable range of temperatures. As employed herein, the expressions "essentially completely" and "essentially opaque" mean that, whereas it is most preferred that all ultraviolet radiations will be blocked, it is possible that an amount will be passed, but that amount is so small as to not preclude the use of the glass for laser protection.

In broad terms, the inventive method comprises exposing a silver halide-containing glass article to a hydrogen-containing atmosphere in a heat treating chamber operating at a temperature between about 375°–500° C. for a period of at least four hours to produce an integral reduced layer in at least one surface of the article having a depth effective to prevent the transmission of ultraviolet radiation and radiation having a wavelength up to 550 nm through the article. Most commonly, the glass article will be so configured that it will have a front surface and a back surface, e.g., a lens for an eyeglass, and the article will be subjected to a stream of flowing hydrogen gas whereby both surfaces will be contacted simultaneously by the gas. In this way, an integral reduced layer will be developed in both surfaces and the heat treatment in the stream of hydrogen gas will be continued for a sufficient length of time such that the combined depth of the two layers will be effective to prevent the transmission through the article of radiation having a wavelength up to 550 nm.

The product resulting from the inventive method comprises a silver halide-containing glass article transparent to visible radiation, but essentially opaque to ultraviolet radiation and optionally to radiation having a wavelength up to 550 nm, said article having at least one surface having an integral reduced surface therein, the depth of that layer being sufficient to effectively prevent the transmission of radiation having a wavelength up to 550 nm through the article.

Whereas the composition ranges of photochromic glasses reported above comprise the preferred glasses, it is only necessary that the glass contain a silver halide to be operable. Hence, we believe that there is chemical reduction of silver in contact with silver halide microcrystals.

It will also be appreciated that, where desired, conventional glass colorants may be included in the base glass compositions to impart a tint to the glass.

Prior Art

U.S. Pat. Nos. 4,190,451, 4,240,836, 4,251,278, 4,390,635, and U.S. Pat. No. 4,979,976, each of which was reviewed in some detail above, are believed to constitute the most pertinent prior art.

Description Of Preferred Embodiments

Figure 5:
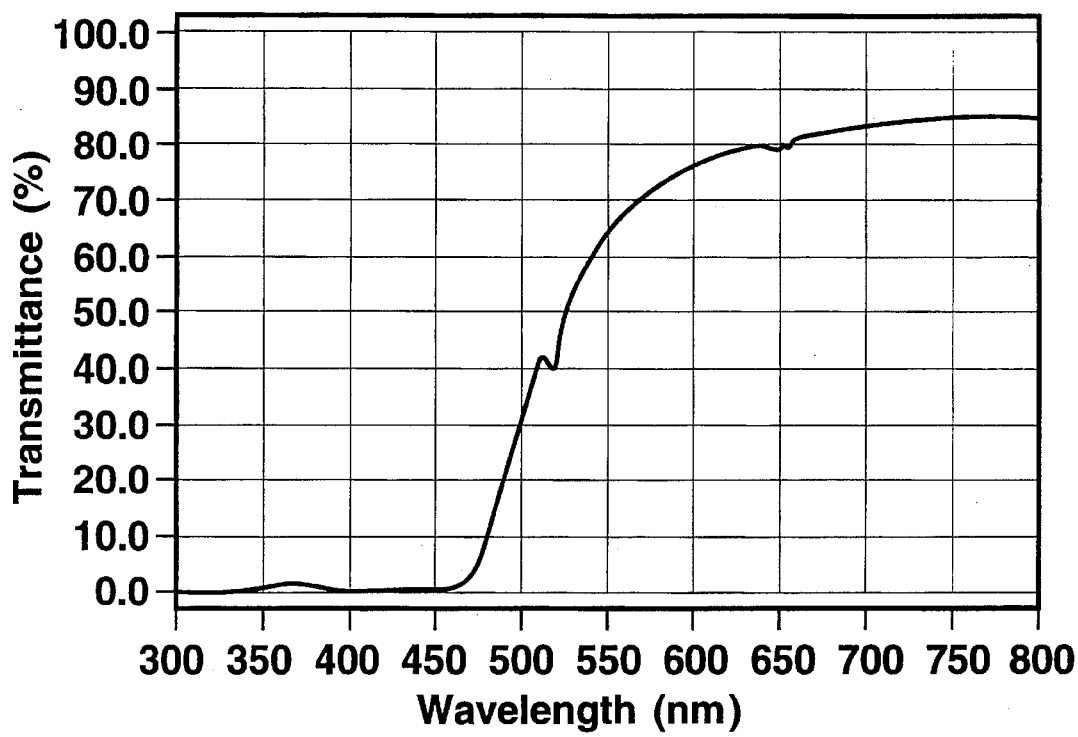
Figure 6:
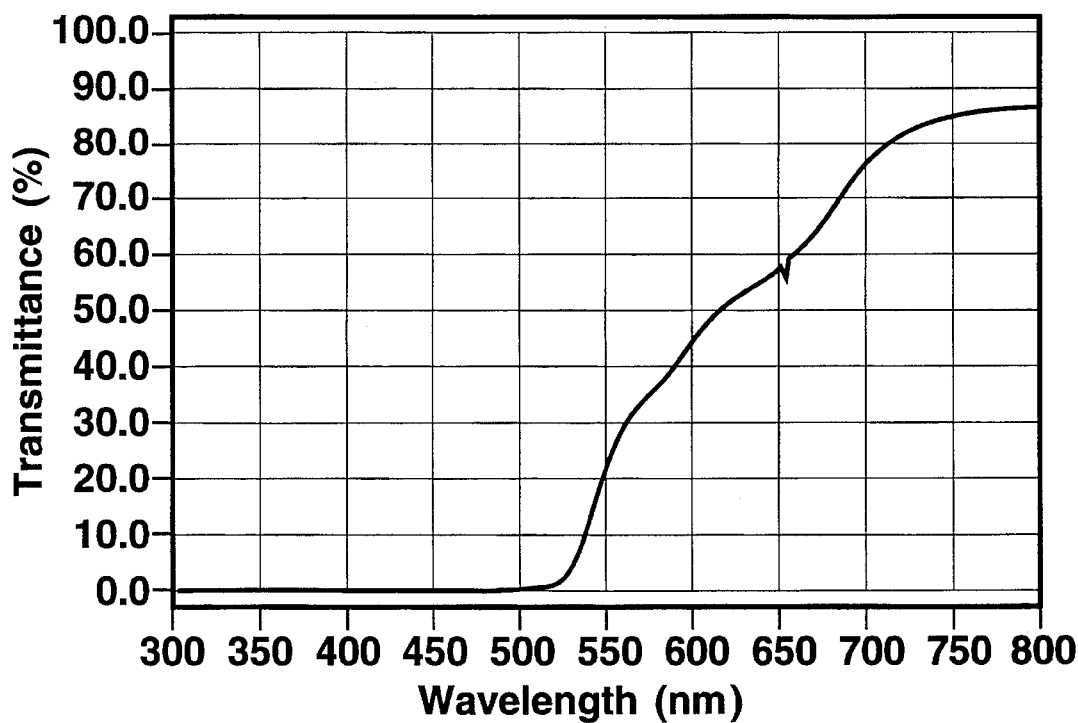
Figure 7:
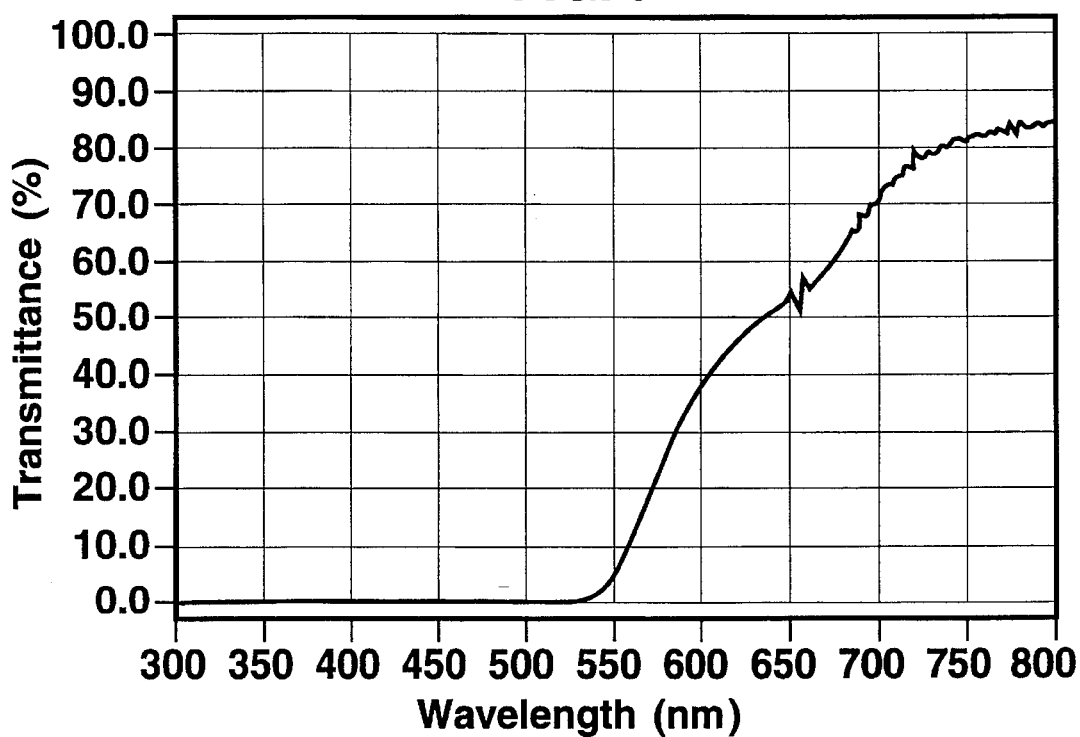
Figure 8:
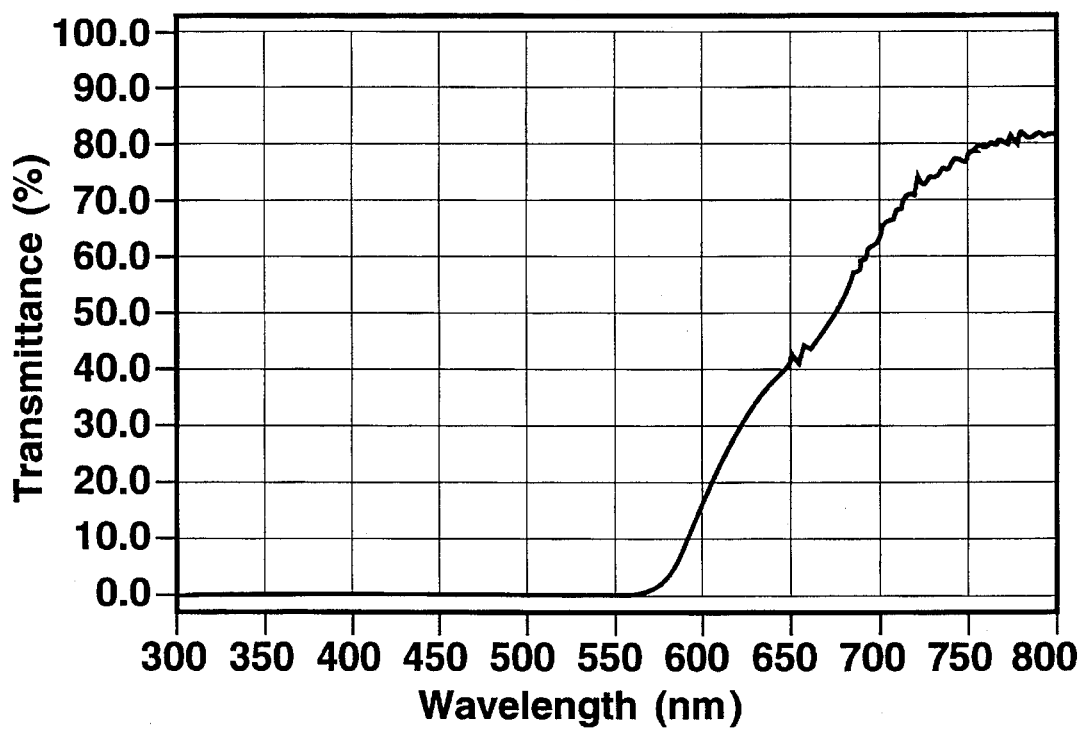

FIGS. 5–8 illustrate operable embodiments of the present invention. FIG. 5 records the transmittance curve of Corning Code 8122 glass fired for four hours in flowing hydrogen gas at a temperature of 475° C. The glass was designed to provide a radiation cutoff below a wavelength of 450 nm. FIG. 6 records the transmittance curve of Corning Code 8113 glass fired for 20 hours in flowing hydrogen gas at a temperature of 428° C. The glass was designed to provide a radiation cutoff below a wavelength of 511 nm. FIG. 7 records the transmittance curve of Corning Code 8113 glass fired for 20 hours in flowing hydrogen gas at a temperature of 416° C. The glass was designed to provide a radiation cutoff below a wavelength of 527 nm. FIG. 8 records the transmittance curve of Corning Code 8113 glass fired for 40 hours in flowing hydrogen gas at a temperature of 402° C. The glass was designed to provide a radiation cutoff below a wavelength of 550 nm. As is readily apparent from a study of those curves, there is essentially no transmission of radiation in the 350–450 nm wavelength interval. Hence, there is no blue light leak.

From a study of the above operable and comparative examples, it can be seen that, through control of the hydrogen firing time and temperature parameters, the development of integral surface layers of precise thicknesses on silver halide-containing glasses is possible, wherein those thicknesses are sufficient to preclude the transmission of ultraviolet radiation therethrough.

From an economic standpoint, the most preferred embodiment of the invention comprises utilizing short firing times at temperatures in the vicinity of 450° C.

We claim:

1. A method for making a glass article that is non-photochromic, that contains a silver halide in the composition, and that has at least one surface that is exposed to ultraviolet radiation and, optionally, to radiation having a wavelength up to 550 nm, which is opaque to such radiation but is transparent to visible radiation having a wavelength longer than the radiation within the region of opacity, said method comprising exposing the entire surface of said article to a hydrogen-containing atmosphere in a heat treating chamber operating at a temperature of at least 375° C., but not higher than 500° C., for a period of at least four hours to produce an integral reduced layer in the entire surface of the article having a depth effective to prevent the transmission of ultraviolet radiation and, optionally, radiation having a wavelength up to 550 nm through said article, and maintaining the integral layer on the entire surface of the article in that reduced state, thereby rendering the article non-photochromic.

2. A method according to claim 1 wherein said article comprises a silver halide-containing glass consisting essentially, expressed in terms of weight percent on the oxide basis, of 0–2.5% $Li_2O$, 0–9% $Na_2O$, 0–17% $K_2O$, 0–6% $Cs_2O$, 8–20% $Li_2O+Na_2O+K_2O+Cs_2$, 14–23% $B_2O_3$, 5–25% $Al_2O_3$, 0–25% $P_2O_5$, 20–65% $SiO_2$, 0.004–0.02% CuO, 0.15–0.3% Ag, 0.1–0.25% Cl, and 0.1–0.2% Br, wherein the molar ratio of alkali metal oxides:$B_2O_3$ ranges about 0.55–0.85, and the weight ratio of Ag:(Cl+Br) ranges about 0.65–0.95.

3. A method according to claim 2 wherein said silver halide-containing glass also contains up to 10% total of the following components in the indicated proportions selected from the group consisting of 0–6% $ZrO_2$, 0–3% $TiO_2$, 0–0.5% PbO, 0–7% BaO, 0–4% CaO, 0–3% MgO, 0–6% $Nb_2O_5$, 0–4% $La_2O_3$, and 0–2% F.

4. A method according to claim 1 wherein said article comprises a silver halide-containing glass consisting essentially, expressed in terms of weight percent on the oxide basis, of 40–76% $SiO_2$, 4–26% $Al_2O_3$, 4–26% $B_2O_3$, at least one alkali metal oxide in the indicated proportions of 2–8% $Li_2O$, 4–15% $Na_2O$, 4–15% $K_2O$, 8–25% $Pb_2O_5$, and 10–30% $Cs_2O$, at least one halogen in the indicated minimum effective proportion of 0.2% Cl, 0.1% Br, and 0.08% I, and a minimum of Ag in the indicated proportion of 0.2% in a glass wherein the effective halogen is Cl, 0.05% in a glass containing at least 0.1% Br, but less than 0.08% I, and 0.03% in a glass containing at least 0.08% I, the sum of those components constituting at least 85% by weight of the total composition.

5. A method according to claim 1 wherein said article comprises a silver halide-containing glass consisting essentially, expressed in terms of weight percent on the oxide basis, of 0–2.5% $Li_2O$, 0–9% $Na_2O$, 0–17% $K_2O$, and 0–8% $Cs_2O$, the sum of $Li_2O+Na_2O+K_2O+Cs_2O$ being 8–20%, 5–25% $Al_2O_3$, 14–23% $B_2O_3$, 40–65% $SiO_2$, 0.004–0.02% CuO, 0.15–0.3% Ag, 0.1–0.25% Cl, 0.1–0.2% Br, the molar ratio of alkali metal oxide:$B_2O_3$ ranges about 0.55–0.85, where the composition is essentially free from divalent metal oxides other than CuO, the weight ratio of Ag:(Cl+Br) ranges about 0.65–0.95, about 0.03–0.25% $Cr_2O_3$, and about 0.025–0.3% $As_2O_3$ and/or $Sb_2O_3$, as analyzed in the glass, wherein over 50% of the copper, is present as $Cu^+$ ions.

6. A method according to claim 5 wherein said silver halide-containing glass also contains up to 10% total of the following components in the indicated proportions selected from the group consisting of 0–6% $ZrO_2$, 0–3% $TiO_2$, 0–1% PbO, 0–7% BaO, 0–4% CaO, 0–3% MgO, 0–6% $Nb_2O_5$, 0–4% $La_2O_3$, and 0–2% F.

7. A method according to claim 1 where said heat treating chamber operates at a temperature of about 450° C. and time of exposure is about four hours.

8. A method according to claim 8 wherein said hydrogen gas-containing atmosphere consists of a flowing stream of hydrogen gas.

\* \* \* \* \*

UNITED STATES PATENT AND TRADEMARK OFFICE
CERTIFICATE OF CORRECTION

PATENT NO. : 5,534,041
DATED : July 9, 1996
INVENTOR(S) : Havens et al.

It is certified that error appears in the above-indentified patent and that said Letters Patent is hereby corrected as shown below:

Column 7, line 35, "$Li_2O+Na_2O+K_2O+Cs_2$" should be --$Li_2O+Na_2O+K_2O+Cs_2O$--.

Column 8, line 29, "copper, is" should be --copper is--.

Column 8, line 40, "to claim 8" should be --to claim 1--.

Signed and Sealed this

Twenty-ninth Day of October 1996

Attest:

BRUCE LEHMAN

Attesting Officer     Commissioner of Patents and Trademarks